United States Patent
Holcombe, Jr.

(10) Patent No.: US 10,815,385 B2
(45) Date of Patent: Oct. 27, 2020

(54) MISCIBLE SOLVENT SYSTEM AND METHOD FOR MAKING SAME

(71) Applicant: ZYP Coatings, Inc., Oak Ridge, TN (US)

(72) Inventor: Cressie E. Holcombe, Jr., Knoxville, TN (US)

(73) Assignee: ZYP Coatings, Inc., Oak Ridge, TN (US)

( * ) Notice: Subject to any disclaimer, the term of this patent is extended or adjusted under 35 U.S.C. 154(b) by 103 days.

(21) Appl. No.: 15/875,502

(22) Filed: Jan. 19, 2018

(65) Prior Publication Data

US 2018/0142106 A1    May 24, 2018

Related U.S. Application Data

(63) Continuation of application No. 14/069,964, filed on Nov. 1, 2013, now Pat. No. 9,909,017.

(51) Int. Cl.
| | |
|---|---|
| *C09D 7/20* | (2018.01) |
| *C11D 17/00* | (2006.01) |
| *C09K 3/30* | (2006.01) |
| *C11D 7/50* | (2006.01) |
| *C09D 7/61* | (2018.01) |

(52) U.S. Cl.
CPC .......... *C09D 7/20* (2018.01); *C09D 7/61* (2018.01); *C09K 3/30* (2013.01); *C11D 7/5018* (2013.01); *C11D 17/0043* (2013.01)

(58) Field of Classification Search
None
See application file for complete search history.

(56) References Cited

U.S. PATENT DOCUMENTS

| | | | | |
|---|---|---|---|---|
| 3,996,153 A | * | 12/1976 | Heeb | C09K 3/30 516/8 |
| 5,759,986 A | * | 6/1998 | Merchant | C08J 9/149 134/10 |
| 6,303,549 B1 | * | 10/2001 | Burdzy | C09K 3/30 508/582 |
| 6,486,103 B1 | * | 11/2002 | Burdzy | C10M 111/04 508/582 |
| 7,473,676 B2 | * | 1/2009 | Artuphel | B08B 3/08 510/407 |
| 9,816,057 B2 | * | 11/2017 | Shellef | B08B 1/00 |
| 2004/0256594 A1 | * | 12/2004 | Singh | A23L 27/202 252/71 |

FOREIGN PATENT DOCUMENTS

DE    4405864 A1 *  8/1995  .......... C10M 103/00

OTHER PUBLICATIONS

English translation of DE-4405864-A1 (Year: 1995).*
3M (Year: 2008).*

* cited by examiner

*Primary Examiner* — Stefanie J Cohen
(74) *Attorney, Agent, or Firm* — John B. Hardaway, III; Nexsen Pruet LLC

(57) ABSTRACT

A miscible solvent system and method for making same having a composition between about 10 to about 90 weight percent PCBTF and between about 10 to about 90 weight percent fluorinated solvent. The miscible solvent system may be combined with boron nitride powder to create a bulk paint system. Further the miscible solvent system may be combined with a propellant to create an aerosol system. The miscible solvent system, bulk paint system, and aerosol system may be nonflammable or flammable and contain VOCs or be VOC free.

2 Claims, 4 Drawing Sheets

MISCIBLE SOLVENT SYSTEM AND METHOD FOR MAKING SAME

CROSS-REFERENCE TO RELATED APPLICATIONS

This application is a continuation application to U.S. patent application Ser. No. 14/069,964, now U.S. Pat. No. 9,909,017, filed Nov. 1, 2013, which is incorporated herein by reference.

BACKGROUND

The present invention relates generally to the field of solvents. More particularly, the present invention relates to a solvent system having a parachlorobenzotrifluoride (PCBTF) component and a fluorinated solvent component that is preferably nonflammable and miscible in all proportions. Furthermore, the solvent system of the present invention preferably has low levels of volatile organic compounds (VOCs) and is safe and relatively environmentally friendly.

Solvents are traditionally used for cleaning, degreasing, coating, and bonding or debonding and are frequently used in connection with ultrasonic cleaning and vapor cleaning. Solvent systems have been significantly restricted over the past couple of decades dues to environmental and safety concerns. For example, it is highly preferred that solvents have a high flash point and are thereby minimally flammable or nonflammable, have low toxicity, have little global warming potential, and produce low or no hazardous air pollutants and VOCs. Further, when solvents are used for cleaning or degreasing valuable products such as electronic and aerospace components, it is highly preferred that such solvents are fast drying and exhibit high dissolving capabilities so that the solvents do not harm the components.

While various solvents are known, there is a need for a nonflammable and highly miscible solvent system that exhibits environmentally friendly characteristics such as low levels of VOCs.

SUMMARY

The present invention includes a miscible solvent system. In one embodiment of the invention, the miscible solvent system has a composition of between about 10 to about 90 weight percent PCBTF and between about 10 to about 90 weight percent fluorinated solvent. In another embodiment of the invention, the solvent system has a composition of between about 20 to about 40 weight percent PCBTF and between about 60 to about 80 weight percent fluorinated solvent. In yet another embodiment of the invention, the solvent system has a composition of between about 67 through 69 weight percent fluorinated solvent and between about 31 through 33 weight percent PCBTF. Further, another embodiment of the present invention includes a miscible solvent system having a composition between about 50 through 59 weight percent fluorinated solvent and between about 41 through 50 weight percent PCBTF. Yet another embodiment of the present invention includes a miscible solvent system having a composition between about 40 to about 44 weight percent fluorinated solvent, between about 36 to about 40 weight percent PCBTF, and between about 18 to about 22 weight percent acetone.

The miscible solvent system may include various fluorinated solvents including those that contain trans-1,2-DCE and those that are trans-1,2-DCE free. Further, the miscible solvent system may be flammable or nonflammable and contain VOCs or be VOC free. The miscible solvent system may be combined with suspenders, binders, fillers such as boron nitride powder, paints, propellants, and/or viscosity modifiers. Further, the miscible solvent system of the present invention may be used as a cleaner, a paint carrier, a coating, a debonder, or a bonding agent and may be inserted into an aerosol container for spraying or used as a bulk paint.

The present invention also includes a bulk paint system. In one embodiment of the invention, the bulk paint system includes boron nitride powder and a miscible solvent having a composition of between about 10 to about 90 weight percent PCBTF and between about 10 to about 90 weight percent fluorinated solvent. In another embodiment of the invention, the bulk paint system includes boron nitride powder and a miscible solvent having a composition of between about 20 to about 40 weight percent PCBTF and between about 60 to about 80 weight percent fluorinated solvent. In yet another embodiment of the invention, the bulk paint system includes boron nitride powder and a miscible solvent having a composition of between about 67 through 69 weight percent fluorinated solvent and between about 31 through 33 weight percent PCBTF. Further, another embodiment of the present invention includes a bulk paint system including boron nitride powder and a miscible solvent having a composition between about 50 through 59 weight percent fluorinated solvent and between about 41 through 50 weight percent PCBTF. In yet another embodiment of the present invention, the bulk paint system includes a miscible solvent having a composition between about 40 through 60 weight percent PCBTF and between about 40 through 60 weight percent fluorinated solvent. The bulk paint system of the present invention may include between about 1 to about 25 weight percent boron nitride powder and between about 75 to about 99 weight percent miscible solvent. In one embodiment of the present invention, the bulk paint system includes 20 weight percent boron nitride powder and in another embodiment, the bulk paint system includes 16 weight percent boron nitride powder.

The bulk paint system may include various fluorinated solvents including those that contain trans-1,2-DCE and those that are trans-1,2-DCE free. Further, the bulk paint system may be flammable or nonflammable and contain VOCs or be VOC free. The bulk paint system may be combined with suspenders, binders, additional fillers, paints, propellants, and/or viscosity modifiers. Further, the bulk paint system of the present invention may be combined with a propellant and inserted into an aerosol container for spraying as an aerosol based spray paint.

The present invention also includes an aerosol system that may be inserted into an aerosol spray container. In one embodiment of the invention, the aerosol system includes a propellant and a miscible solvent having a composition of between about 10 to about 90 weight percent PCBTF and between about 10 to about 90 weight percent fluorinated solvent. In another embodiment of the invention, the aerosol system includes a propellant and a miscible solvent having a composition of between about 20 to about 40 weight percent PCBTF and between about 60 to about 80 weight percent fluorinated solvent. In yet another embodiment of the invention, the aerosol system includes a propellant and a miscible solvent having a composition of between about 67 through 69 weight percent fluorinated solvent and between about 31 through 33 weight percent PCBTF. Further, another embodiment of the present invention includes an aerosol system including a propellant and a miscible solvent having a composition between about 50 through 59 weight percent fluorinated solvent and between about 41 through 50 weight percent PCBTF. The aerosol system of the present invention may include between about 20 to about 50 weight percent propellant and between about 45 to about 80 weight percent miscible solvent. Further, the aerosol system of the present invention may include between about 32 to about 45 weight percent propellant and between about 46 to about 69 weight percent miscible solvent.

The aerosol system may include various fluorinated solvents including those that contain trans-1,2-DCE and those that are trans-1,2-DCE free. Further, the aerosol system may be flammable or nonflammable and contain VOCs or be VOC free. The aerosol system may be combined with suspenders, binders, fillers such as boron nitride powder, paints, additional propellants, and/or viscosity modifiers. Further, the aerosol system of the present invention may be used as a cleaner, a coating, or a paint. In one embodiment of the present invention, the aerosol system includes between about 32 to about 45 weight percent propellant, between about 46 to about 62 weight percent miscible solvent system, and between about 7 to about 9 weight percent boron nitride powder.

The present invention also includes a method of manufacturing a miscible solvent system. In one embodiment of the invention, the method includes the steps of providing a composition having between about 10 to about 90 weight percent PCBTF and between about 10 to about 90 weight percent fluorinated solvent and then mixing the composition to create a miscible liquid. A boron nitride powder may also be provided and mixed with the miscible liquid to create a bulk paint. Further, a propellant may be added and mixed with the miscible liquid to create an aerosol. The aerosol may be inserted into an aerosol container capable of spraying the aerosol and/or mixed with boron nitride powder to create an aerosol mixture.

DETAILED DESCRIPTION OF REPRESENTATIVE EMBODIMENTS

Figure 1:
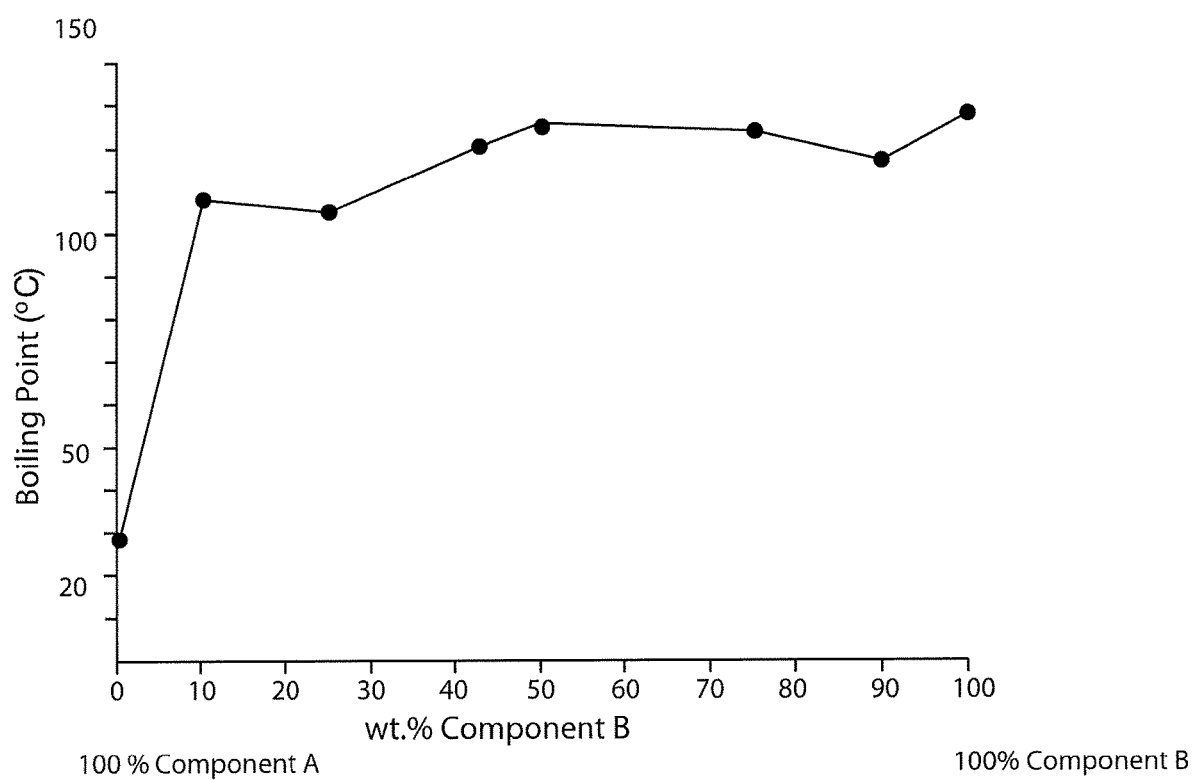
FIG. 1 is a schematic diagram of boiling point versus percent concentration of PCBTF in a solvent system also having a fluorinated solvent wherein the fluorinated solvent includes 1,1,1,2,2,3,4,5,5,5-decafluoropentane and trans-1,2-DCE.

The present invention relates to a solvent system and composition. The solvent system is preferably highly miscible and may be flammable, nonflammable, or have low flammability. Further, the solvent system is preferably VOC free or has low VOC levels thereby making it relatively safe and environmentally friendly. The solvent system of the present invention preferably exhibits exceptional cleaning capabilities while also being capable of acting as a carrier or vehicle for paints and/or coatings. Although primarily described herein in terms of its use as a cleaner, paint vehicle, debonder, or bonding agent, it will be clear that the solvent system and composition of the present invention may have various other uses. Further, the solvent system of the present invention may also be combined with suspenders, binders, and/or fillers so that it can be used in an aerosol can and yield a preferably nonflammable aerosol cleaner or coating.

Unless otherwise stated, the following terms used in the specification and claims have the meanings given below.

As used herein unless otherwise stated, the term "flash point" refers to the lowest temperature at which a material can vaporize to form an ignitable mixture in air.

As used herein unless otherwise stated, the term "flammable" refers to liquids with a flash point less than about 100 degree Fahrenheit (38 degrees Celsius) when an ignition source is used.

As used herein unless otherwise stated, the term "combustible" refers to liquids with a flash point less than about 200 degrees Fahrenheit (93 degrees Celsius) but greater than about 100 degree Fahrenheit (38 degrees Celsius).

As used herein unless otherwise stated, the term "nonflammable" refers to liquids with a flash point greater than about 200 degree Fahrenheit (93 degrees Celsius).

As used herein unless otherwise stated, the term "miscible" refers to when two or more chemicals are mixed together at prescribed percentages they do not separate into two or more phases.

As used herein unless otherwise stated, the term "miscible solvent" refers to a solvent in which all of the constituents are miscible without the inclusion of a surfactant or emulsifier to prevent separation of the mixture into two or more phases.

As used herein unless otherwise stated, the terms "VOC free," "VOC exempt," and "Non-VOC" are used interchangeably and refer to the United States classifications concerning the levels of volatile organic compounds in liquids and solvents.

The solvent system and composition of the present invention is generally composed of at least two primary components: a parachlorobenzotrifluoride (PCBTF) and a fluorinated solvent. In one embodiment of the present invention, PCBTF is between approximately 10 to approximately 90 weight percent of the solvent composition. Furthermore, the solvent composition includes approximately 10 to approximately 90 weight percent fluorinated solvent.

PCBTF is an organic chemical compound with the molecular formula $C_7H_4ClF_3$. Oxcol 100™ is a brand name of a commonly sold PCBTF. PCBTF is a VOC-exempt liquid that has environmentally friendly properties and is classified as having combustible properties. The flash point of PCBTF is typically about 109 degrees Fahrenheit (approximately 43 degrees Celsius).

Various fluorinated solvents, such as hydrofluorocarbons (HFCs) and/or hydrofluoroethers (HFEs), may be used to compose the solvent system of the present invention. As a more particular example, methoxy-nonafluorobutane, also known as HFE 7100, may be used. HFE 7100 has a molecular formula of $C_4F_9OCH_3$ or $C_5F_9O$ $H_3$ and is frequently sold under the brand name Novec 7100™ Another fluorinated solvent that may be used in connection with the present invention includes 1,1,1,2,2,3,4,5,5,5-decafluoropentane, which may be sold under the brand name Vertrel XF™ and has a molecular formula of $C_5F_{10}H_2$.

The fluorinated solvent of the present invention may also include a combination of solvents or may be combined with other chemical compositions. For example, a fluorinated solvent may be combined with 1,2-dichloroethylene, also commonly known as 1,2-dichloroethene and 1,2-DCE, and having a molecular formula C2H2Cl2 or CClHCClH. Either geometric isomer of 1,2-DCE, including cis-1,2-DCE or trans-1,2-DCE, may be used. By itself, 1,2-DCE is very flammable with a flash point of approximately 55.4 degrees Fahrenheit (13 degrees Celsius). Further, 1,2-DCE, while not considered a carcinogen, is considered a VOC and therefore is not a preferred component at least in large quantities.

Vertrel-MCA™ is a brand name of a fluorinated solvent incorporating 1,1,1,2,2,3,4,5,5,5-decafluoropentane in combination with trans-1,2-DCE that may be used in the present invention. The Vertrel-MCA™ composition includes approximately 61 through 63 weight percent 1,1,1,2,2,3,4,5,5,5-decafluoropentane and approximately 37 through 39 weight percent trans-1,2-DCE. Alternatively a combination or blend of hydrofluoroethers (HFEs), such as ethyl nonafluorobutyl ether ($C_6H_5F_9O$), ethyl nonafluoroisobutyl ether ($C_6H_5F_9O$), methyl nonafluorobutyl ether ($C_5H_3F_9O$), and methyl nonafluoroisobutyl ether ($C_5H_3F_9O$), may be used to compose the fluorinated solvent. Novec 72DE™ is a brand name of a suitable blend of the above disclosed HFEs, which also includes trans-1,2-DCE. Novec 72DE™ includes approximately 68 through 72 weight percent trans-1,2-DCE, approximately 4 through 16 weight percent ethyl nonafluorobutyl ether, approximately 4 through 16 weight percent ethyl nonafluoroisobutyl ether, approximately 2 through 8 percent methyl nonafluorobutyl ether, and approximately 2 through 8 percent methyl nonafluoroisobutyl ether. A blend of hydrofluorocarbons may also be used such as a combination of 1,1,1,3,3-pentafluorobutane ($C_4H_5F_5$), also known as HFC-365mfc, and 1,1,1,2,3,3,3-heptafluoropropane ($C_3HF_7$), also known as HFC-227ea. Solkane 365/227™ is a brand name of a suitable blend of the above disclosed HFCs, which may be used with or without the addition of trans-1,2-DCE. In one embodiment, the blend of hydrofluorocarbons includes approximately 7 weight percent 1,1,1,2,3,3,3-heptafluoropropane and approximately 93 weight percent 1,1,1,3,3-pentafluorobutane. In another embodiment, the blend of hydrofluorocarbons includes approximately 13 weight percent 1,1,1,2,3,3,3-heptafluoropropane and approximately 87 weight percent 1,1,1,3,3-pentafluorobutane. Additional fluorinated solvent compositions, including fluorinated solvent combinations, may be used as will be understood by those of skill in the arts without departing from the scope of the present invention.

The solvent system of the present invention may be used for many applications and determination of a composition typically depends on the particular use of the solvent system. For example, one composition may have properties better suited for cleaning while a different composition may have properties better suited for mixing with concentrated paints or coatings to act as a carrier for such concentrated paints or coatings. Further, one composition may have properties better suited for ultrasonic cleaning while a different composition may have properties better suited for cleaning electronics. Moreover, certain compositions may be used as a bonding agent while additional compositions may be used as a debonder.

As discussed above, the solvent system and composition of the present invention includes approximately 10 to approximately 90 weight percent PCBTF and approximately 10 to approximately 90 weight percent fluorinated solvent. It is preferred to include no more than 90 weight percent HFC and/or HFE solvents because of the traditionally high costs associated with purchasing these products. It is also preferred to include no more than 90 weight percent PCBTF because PCBTF amounts above this may significantly increase the evaporating time of the solvent, which is typically not preferred. It is also preferred that the PCBTF and fluorinated solvent is miscible in all proportions when mixed. In certain embodiments, the solvent system is non-flammable while in alternative embodiments the solvent system is flammable. Furthermore, in certain embodiments of the present invention, the solvent system is VOC free while in alternative embodiments, the solvent system contains VOCs; however, it is preferred that VOC containing components are incorporated at minimum levels to reduce the overall levels of VOC in the solvent system.

For certain applications and fluorinated solvents, the solvent system and composition of the present invention preferably includes approximately 20 to approximately 40 weight percent PCBTF and approximately 60 to approximately 80 weight percent fluorinated solvent. Further for such applications and fluorinated solvents, the solvent system and composition may even more preferably include approximately 31 to approximately 33 weight percent PCBTF and approximately 67 to approximately 69 weight percent fluorinated solvent. For an alternative application, the solvent system and composition of the present invention preferably includes approximately 40 to approximately 50 weight percent PCBTF and approximately 50 to approximately 60 weight percent fluorinated solvent. Further for such applications, the solvent system and composition may even more preferably include approximately 41 to approximately 50 weight percent PCBTF and approximately 50 to approximately 59 weight percent fluorinated solvent.

The solvent system and composition of the present invention may be trans-1,2-DCE free to reduce or eliminate the presence of VOCs. Alternatively, the solvent system may include trans-1,2-DCE to utilize azeotropes and thereby increase the dissolving ability and compatibility of the solvent system with typical binders, suspenders, and viscosity modifiers. Incorporating trans-1,2-DCE may also assist with creating a single phase mixture that is less likely to result in a flammable occurrence due to varying dissolving chemistries. A lower VOC level may be achieved if smaller quantities of trans-1,2-DCE are incorporated, such as less than 38 weight percent trans-1,2-DCE of the total fluorinated solvent system. Trans-1,2-DCE levels may however range at or above 72 weight percent of the total fluorinated solvent system without departing from the spirit and scope of the present invention.

Examples of fluorinated solvents that can be used independent of trans-1,2-DCE include HFE 7100, 1,1,1,2,2,3,4,5,5,5-decafluoropentane, and HFC blends such as a combination of 1,1,1,3,3-pentafluorobutane and 1,1,1,2,3,3,3-heptafluoropropane. In one embodiment, the blend of hydrofluorocarbons includes approximately 7 weight percent 1,1,1,2,3,3,3-heptafluoropropane and approximately 93 weight percent 1,1,1,3,3-pentafluorobutane. In another embodiment, the blend of hydrofluorocarbons includes approximately 13 weight percent 1,1,1,2,3,3,3-heptafluoropropane and approximately 87 weight percent 1,1,1,3,3-pentafluorobutane. Examples of fluorinated solvents that may incorporate trans-1,2-DCE include 1,1,1,2,2,3,4,5,5,5-decafluoropentane, blends of hydrofluoroethers such as ethyl nonafluorobutyl ether, ethyl nonafluoroisobutyl ether, methyl nonafluorobutyl ether, and methyl nonafluoroisobutyl ether, and as discussed above HFE 7100. In one embodiment, the fluorinated solvent includes between about 61 to about 63 weight percent 1,1,1,2,2,3,4,5,5,5-decafluoropentane and between about 37 to about 39 weight percent trans-1,2-DCE. In another embodiment, the fluorinated solvent includes about 68 to about 72 weight percent trans-1,2-DCE and about 28 to about 32 weight percent mixture of hydroflouroethers. Further, in one embodiment, the blend of hydroflouroethers includes approximately 4 through 16 weight percent of ethyl nonafluorobutyl ether, approximately 4 through 16 weight percent of ethyl nonafluoroisobutyl ether, approximately 2 through 8 weight percent of methyl nonafluorobutyl ether, and approximately 2 through 8 weight percent of methyl nonafluoroisobutyl ether. In yet another embodiment, the fluorinated solvent includes about 90 weight percent trans-1,2-DCE and 10 weight percent HFE 7100 (sold under the brand name Novec 71D90).

Additional fluorinated solvents may be used in connection with the solvent system of the present invention either with or without the incorporation of trans-1,2-DCE without departing from the spirit and scope of the present invention. Furthermore, trans-1,2-DCE may be incorporated independent of the fluorinated solvent.

Additives and agents, such as organic containing binders, suspenders, and viscosity modifiers may be incorporated into the solvent system of the present invention. Such additives may be those that are typically used in paints and coatings. Examples of typical binders and/or suspenders include cellulosics, including hydroxypropylcellulose or ethyl cellulose, and polyvinylpyrrolidone. The viscosity modifiers are preferably those that are compatible with non-aqueous fluids and liquids, such as organoclays. Compatible powder additives such as boron nitride powders and metal powders may also be incorporated into the solvent system of the present invention. Furthermore additives such as alternatives to trans-1,2-DCE may be incorporated into the solvent system. Example trans-1,2-DCE alternatives include acetone, octyl alcohol (CAS 111-87-5), tea tree oil (CAS 68647-73-4), polyalkylene glycol derivative (CAS 9038-95-3), alpha terpineol (CAS 98-55-5), and combinations thereof. When additives such as acetone are incorporated, the solvent system may become flammable.

When such additives or agents are incorporated, the total weight percents of PCBTF and fluorinated solvent for the entire composition may be proportionally reduced. In one embodiment, the solvent system and composition may include approximately 35 to approximately 50 weight percent fluorinated solvent, approximately 30 to approximately 45 weight percent PCBTF, and approximately 15 to approximately 30 weight percent additives. In yet another embodiment, when an additive such as acetone is incorporated, the solvent system and composition preferably includes approximately 40 to approximately 44 weight percent fluorinated solvent, approximately 36 to approximately 40 weight percent PCBTF, and approximately 18 to approximately 22 weight percent acetone.

Selection of a particular composition for a solvent system will further typically depend on the preferred evaporation and drying rate as well as the cost of the solvent system. With respect to the cost of the solvent system, 1,2-DCE and PCBTF are typically significantly less expensive than the relatively pure HFE and HFC solvents. Thus, it is often preferred to include higher levels of 1,2-DCE and PCBTF in the solvent system. Depending on the use of the solvent system, different evaporation and drying rates are preferred. For instance, slower drying may be preferred for solvent cleaning because it allows organic residues longer to be dissolved and then flow off.

The solvent system and composition of the present invention may comprise a filler material such as boron nitride powder solids and/or other compatible powder additives such as metal powders. Further, the solvent system may include a propellant, such as HFO-1234ze or HFC-134a, for insertion of the solvent system into an aerosol can for spraying the solvent system. HFC-134a is also known as 1,1,1,2-tetrafluoroethane and has a molecular formula $CF_3CH_2F$. HFC-134a is VOC exempt; however some studies have identified it as a contributor to climate change and global warming. HFO-1234ze is also known as 1,3,3,3-tetrafluoropropen and has a molecular formula of $C_3H_2F_4$. HFO-1234ze is a relatively new propellant that is also VOC exempt, has zero ozone-depletion potential, and has low global warming potential. Unlike traditional $CO_2$ propellants, both the HFC-134a propellant and the HFO-1234ze propellant typically allow for uniform spray until the aerosol is emptied. Furthermore, both HFC-134a and HFO-1234ze are nonflammable propellants, which traditionally have sprays similar to flammable sprays. A filler material such as boron nitride solids may also be included in the aerosol mixture.

The solvent system and composition of the present invention may be incorporated into a bulk paint system. The bulk paint system preferably includes a miscible solvent system, such as the compositions discussed hereinabove, in combination with compatible filler material such as boron nitride powder solids. In one embodiment of the bulk paint system, the system includes a miscible solvent system having between about 10 to about 90 weight percent PCBTF and between about 10 to about 90 weight percent fluorinated solvent. In another embodiment of the bulk paint system, the system includes a miscible solvent having between about 20 to about 40 weight percent PCBTF and between about 60 to about 80 weight percent fluorinated solvent. In yet another embodiment of the bulk paint system, the system includes a miscible solvent having between about 40 to about 60 weight percent PCBTF and between about 40 to about 60 weight percent fluorinated solvent. The bulk paint system of the present invention may include between about 1 to about 25 weight percent boron nitride powder and between about 75 to about 99 weight percent miscible solvent.

The bulk paint system of the present invention may be trans-1,2-DCE free to reduce or eliminate the presence of VOCs. Alternatively, the bulk paint system may include trans-1,2-DCE to, as discussed above, utilize azeotropes and thereby increase the dissolving ability and compatibility of the bulk paint system with typical binders, suspenders, and viscosity modifiers.

Examples of fluorinated solvents that can be used in the bulk paint system of the present invention include HFE 7100, HFC blends such as a combination of 1,1,1,3,3-pentafluorobutane and 1,1,1,2,3,3,3-heptafluoropropane, 1,1,1,2,2,3,4,5,5,5-decafluoropentane, 1,1,1,2,2,3,4,5,5,5-decafluoropentane with trans-1,2-DCE, and blends of hydrofluoroethers such as ethyl nonafluorobutyl ether, ethyl nonafluoroisobutyl ether, methyl nonafluorobutyl ether, and methyl nonafluoroisobutyl ether with or without trans-1,2-DCE. In one embodiment, the fluorinated solvent includes between about 61 to about 63 weight percent 1,1,1,2,2,3,4,5,5,5-decafluoropentane and between about 37 to about 39 weight percent trans-1,2-DCE. In another embodiment, the fluorinated solvent includes about 68 to about 72 weight percent trans-1,2-DCE and about 28 to about 32 weight percent mixture of hydroflouroethers. Further, in one embodiment, the blend of hydroflouroethers includes approximately 4 through 16 weight percent of ethyl nonafluorobutyl ether, approximately 4 through 16 weight percent of ethyl nonafluoroisobutyl ether, approximately 2 through 8 weight percent of methyl nonafluorobutyl ether, and approximately 2 through 8 weight percent of methyl nonafluoroisobutyl ether. In one embodiment incorporating hydrofluorocarbons as the fluorinated solvent, the blend of hydrofluorocarbons includes approximately 7 weight percent 1,1,1,2,3,3,3-heptafluoropropane and approximately 93 weight percent 1,1,1,3,3-pentafluorobutane. In another embodiment, the blend of hydrofluorocarbons includes approximately 13 weight percent 1,1,1,2,3,3,3-heptafluoropropane and approximately 87 weight percent 1,1,1,3,3-pentafluorobutane.

In an embodiment incorporating a blend of hydroflouroethers, the bulk paint system includes approximately 84 weight percent miscible solvent and approximately 16 weight percent boron nitride powder. In an embodiment incorporating HFE 7100, the bulk paint system includes approximately 80 weight percent miscible solvent and approximately 20 weight percent boron nitride powder. Likewise in yet another embodiment incorporating 1,1,1,2,2,3,4,5,5,5-decafluoropentane, the bulk paint system includes approximately 80 weight percent miscible solvent and approximately 20 weight percent boron nitride powder. In yet another embodiment, the fluorinated solvent includes about 90 weight percent trans-1,2-DCE and 10 weight percent HFE 7100. In another embodiment incorporating an HFC blend, such as a combination of 1,1,1,3,3-pentafluorobutane and 1,1,1,2,3,3,3-heptafluoropropane, the system includes about 40 through 44 weight percent PCBTF, about 40 through 44 weight percent fluorinated solvent, and about 16 weight percent boron nitride powder.

Additional fluorinated solvents may be used in connection with the bulk paint system of the present invention either with or without the incorporation of trans-1,2-DCE without departing from the spirit and scope of the present invention. Furthermore, trans-1,2-DCE may be incorporated independent of the fluorinated solvent.

Additives and agents, such as those disclosed above may be incorporated into the bulk paint system of the present invention. For example, additives such as benzyl alcohol, butyl carbitol, and/or amyl butyrate may be added to improve paintability and brushability. The bulk paint system may incorporate a propellant, such as HFO-1234ze or HFC-134a, for insertion of the solvent system into an aerosol can for spraying the paint system. When such additives, agents, and/or propellants are incorporated, the total weight percents of the miscible solvent and boron nitride powder for the entire composition may be proportionally reduced.

Further, in certain embodiments, it is desirable for the bulk paint system to be nonflammable while in alternative embodiments the bulk paint system may be flammable. Furthermore, in certain embodiments of the bulk paint system, the system is VOC free while in alternative embodiments, the bulk paint system contains VOCs; however, it is preferred that VOC containing components are incorporated at minimum levels to reduce the overall levels of VOC in the bulk paint system.

The solvent system and composition of the present invention may also be incorporated into an aerosol system. The aerosol system preferably includes a miscible solvent system, such as the compositions discussed hereinabove, in combination with a propellant. The aerosol system may be inserted into an aerosol spray container, such as an aerosol can, for spraying the aerosol system onto a surface. An example aerosol sprayer system includes a Preval™ system, which may include a butane/propane propellant. In one embodiment of the aerosol system, the system includes a miscible solvent system having between about 10 to about 90 weight percent PCBTF and between about 10 to about 90 weight percent fluorinated solvent. In another embodiment of the aerosol system, the system includes a miscible solvent having between about 20 to about 40 weight percent PCBTF and between about 60 to about 80 weight percent fluorinated solvent. In yet another embodiment of the aerosol system, the system includes a miscible solvent having between about 31 to about 33 weight percent PCBTF and between about 67 to about 69 weight percent fluorinated solvent.

The aerosol system of the present invention may include between about 20 to about 50 weight percent propellant and between about 45 to about 80 weight percent miscible solvent. Further, the aerosol system of the present invention may include between about 32 to about 45 weight percent propellant and between about 46 to about 69 weight percent miscible solvent.

Examples of propellants that may be used with the aerosol system include HFO-1234ze and HFC-134a. These propellants are highly beneficial because of their nonflammable and low or no VOC properties. Additional propellants, including flammable propellants, nonflammable propellants, VOC free propellants, and VOC containing propellants, may be used, however, without departing from the spirit and the scope of the present invention. Furthermore, the flammable properties of traditionally flammable propellant such as butane and propane may be reduced or eliminated when used in connection with the solvent system of present invention.

The aerosol system of the present invention may be trans-1,2-DCE free to reduce or eliminate the presence of VOCs. Alternatively, the aerosol system may include trans-1,2-DCE to, as discussed above, utilize azeotropes and thereby increase the dissolving ability and compatibility of the aerosol system with typical binders, suspenders, and viscosity modifiers.

Examples of fluorinated solvents that can be used in the aerosol system of the present invention include HFE 7100, HFC blends such as a combination of 1,1,1,3,3-pentafluorobutane and 1,1,1,2,3,3,3-heptafluoropropane, 1,1,1,2,2,3,4,5,5,5-decafluoropentane, 1,1,1,2,2,3,4,5,5,5-decafluoropentane with trans-1,2-DCE, and blends of hydrofluoroethers such as ethyl nonafluorobutyl ether, ethyl nonafluoroisobutyl ether, methyl nonafluorobutyl ether, and methyl nonafluoroisobutyl ether with or without trans-1,2-DCE. In one embodiment, the fluorinated solvent includes between about 61 to about 63 weight percent 1,1,1,2,2,3,4,5,5,5-decafluoropentane and between about 37 to about 39 weight percent trans-1,2-DCE. In another embodiment, the fluorinated solvent includes about 68 to about 72 weight percent trans-1,2-DCE and about 28 to about 32 weight percent mixture of hydroflouroethers. Further, in one embodiment, the blend of hydroflouroethers includes approximately 4 through 16 weight percent of ethyl nonafluorobutyl ether, approximately 4 through 16 weight percent of ethyl nonafluoroisobutyl ether, approximately 2 through 8 weight percent of methyl nonafluorobutyl ether, and approximately 2 through 8 weight percent of methyl nonafluoroisobutyl ether. In yet another embodiment, the fluorinated solvent includes about 90 weight percent trans-1,2-DCE and 10 weight percent HFE 7100. In one embodiment incorporating a blend of hydrofluorocarbons as the fluorinated solvent, the blend of hydrofluorocarbons includes approximately 7 weight percent 1,1,1,2,3,3,3-heptafluoropropane and approximately 93 weight percent 1,1,1,3,3-pentafluorobutane. In another embodiment, the blend of hydrofluorocarbons includes approximately 13 weight percent 1,1,1,2,3,3,3-heptafluoropropane and approximately 87 weight percent 1,1,1,3,3-pentafluorobutane.

Additional fluorinated solvents may be used in connection with the aerosol system of the present invention either with or without the incorporation of trans-1,2-DCE without departing from the spirit and scope of the present invention. Furthermore, trans-1,2-DCE may be incorporated independent of the fluorinated solvent.

Additives and agents, such as those disclosed above and including suspenders, binders, and viscosity modifiers, may be incorporated into the aerosol system of the present invention. Paints and fillers such as boron nitride powder solids and/or metal powders may also be incorporated into the aerosol system creating an aerosol based spray paint or coating. When such additives, agents, paints, and fillers are incorporated, the total weight percents of the miscible solvent and propellant for the entire composition may be reduced. In one embodiment, the aerosol system includes about 32 to about 45 weight percent propellant, between about 46 to about 62 weight percent miscible solvent, and between about 7 to about 9 weight percent boron nitride powder.

Further, in certain embodiments, it is desirable for the aerosol system to be nonflammable while in alternative embodiments the aerosol system may be flammable. Furthermore, in certain embodiments of the aerosol system, the system is VOC free while in alternative embodiments, the aerosol system contains VOCs; however, it is preferred that VOC containing components are incorporated at minimum levels to reduce the overall levels of VOC in the aerosol system.

The aerosol system of the present invention may have a variety of uses. For example, one composition of the aerosol system may be used as a cleaner. Another composition of the aerosol system may be combined with suspenders, binders, and/or compatible filler material and used as a paint or coating.

Having generally described this instant disclosure, a further understanding can be obtained by reference to certain specific examples illustrated below which are provided for purposes of illustration only and are not intended to be all inclusive or limiting unless otherwise specified.

Testing & Examples

The preparation, identification, and testing of example compositions of this disclosure are further described below. The particular materials and amounts thereof recited in these examples, as well as other conditions and details, should not be construed to unduly limit this invention. In these examples, all percentages, proportions and ratios are by weight unless otherwise indicated.

Testing was initially performed using the above fluorinated solvents alone to determine their ability to act as a carrier or vehicle for paints and/or coatings. In the tests, the fluorinated solvents were combined with additives including organic-containing binders, suspenders, and viscosity modifiers that are typically used in paints and coatings. As discussed above, examples of typical binders and/or suspenders include cellulosics, including hydroxypropylcellulose or ethyl cellulose, and polyvinylpyrrolidone. The viscosity modifiers are preferably those that are compatible with non-aqueous fluids and liquids, such as organoclays.

HFE 7100 was independently tested but did not dissolve or combine well with the organic-containing binders, suspenders, and viscosity modifiers. 1,1,1,2,2,3,4,5,5,5-decafluoropentane was also independently tested but likewise did not dissolve or combine well with the organic-containing binders, suspenders, and viscosity modifiers. Fluorinated solvents containing 1,2-DCE were also tested. Specifically, the composition disclosed above and identified under the brand names Vertrel-MCA™ and Novec 72DE™ were each independently tested. These compositions containing a combination of fluorinated solvent with trans-1,2-DCE had better dissolving abilities likely due to the addition of the trans-1,2-DCE. However, even the fluorinated solvents having trans-1,2-DCE in combination with the HFEs and HFCs, did not have sufficient solvency or compatibility with the binders, suspenders, and viscosity modifiers.

PCBTF, which is a VOC-exempt liquid, was also independently tested without the addition of HFCs or HFEs. PCBTF dissolved well and was compatible with typical binders, suspenders, and viscosity modifiers used with paints and coatings.

The combination of PCBTF and fluorinated solvents at varying weight percents was then tested to determine the dissolving ability and compatibility with typical binders, suspenders, and viscosity modifiers used with paints and coatings as well as the resulting flash point of the composition. The test results of the PCBTF and fluorinated solvent compositions are discussed below.

The flash point of each of the following combinations of PCBTF and fluorinated solvent was tested at Galbraith Laboratories in Knoxville, Tenn. by ASTM D93-11 (Pensky Martens Closed Cup). Combining PCBTF with HFC and HFE fluorinated solvents resulted in a solvent system that was miscible in all proportions.

Table I below shows that no flash was observed in a composition having 10 weight percent PCBTF and 90 weight percent fluorinated solvent. Thus, these compositions revealed nonflammable solvents.

TABLE I

| Weight % Component I | Weight % Component II | Flash Point |
|---|---|---|
| 10% PCBTF (Oxsol-100 ™) | 90% Combination of about 61-63% 1,1,1,2,2,3,4,5,5,5-decafluoropentane and about 37-39% trans-1,2-DCE (Vertrel-MCA ™) | No Flash Observed |
| 10% PCBTF (Oxsol-100 ™) | 90% 1,1,1,2,2,3,4,5,5,5-decafluoropentane (Vertrel-XF ™) | No Flash Observed |
| 10% PCBTF (Oxsol-100 ™) | 90% HFE 7100 (Novec 7100 ™) | No Flash Observed |

Table II below likewise shows that no flash was observed in a composition having 43 weight percent PCBTF and 57 weight percent fluorinated solvent. Thus, these compositions revealed nonflammable solvents.

TABLE II

| Weight % Component I | Weight % Component II | Flash Point |
|---|---|---|
| 43% PCBTF (Oxsol-100 ™) | 57% Combination of about 61-63% 1,1,1,2,2,3,4,5,5,5-decafluoropentane and about 37-39% trans-1,2-DCE (Vertrel-MCA ™) | No Flash Observed |
| 43% PCBTF (Oxsol-100 ™) | 57% 1,1,1,2,2,3,4,5,5,5-decafluoropentane (Vertrel-XF ™) | No Flash Observed |
| 43% PCBTF (Oxsol-100 ™) | 57% HFE 7100 (Novec 7100 ™) | No Flash Observed |

Table III below also shows that no flash was observed even in a composition having 90 weight percent PCBTF and 10 weight percent fluorinated solvent. Thus, these compositions revealed nonflammable solvents.

TABLE III

| Weight % Component I | Weight % Component II | Flash Point |
|---|---|---|
| 90% PCBTF (Oxsol-100 ™) | 10% Combination of about 61-63% 1,1,1,2,2,3,4,5,5,5-decafluoropentane and about 37-39% trans-1,2-DCE (Vertrel-MCA ™) | No Flash Observed |
| 90% PCBTF (Oxsol-100 ™) | 10% 1,1,1,2,2,3,4,5,5,5-decafluoropentane (Vertrel-XF ™) | No Flash Observed |
| 90% PCBTF (Oxsol-100 ™) | 10% HFE 7100 (Novec 7100 ™) | No Flash Observed |

The Kauri-Butanol value ("KB Value") was determined to be 35 for the composition having 43 percent PCBTF and 57 percent combination of about 61-63% 1,1,1,2,2,3,4,5,5,5-decafluoropentane and about 37-39% trans-1,2-DCE (Vertrel-MCA™). The KB Value is a standardized measure of solvent power for a solvent and is governed by an ASTM standardized test, ASTM D1133. Typically the higher the Kauri-Butanol value, the more aggressive or active the solvent is in its ability to dissolve certain materials. The KB Value was approximately the proportional composition average KB value for the separate components, which was approximately 38. Particularly, the KB Value of PCBTF is 64 and the KB Value of Vertrel-MCA™ is 18. The proportional composition KB Value was derived as follows:

(43% PCBTF×KB Value PCBTF)+(57% Vertrel-MCA™×KB Value Vertrel-MCA™)

Because the actual KB Value and the proportional composition average KB values are nearly the same for the above composition, the approximate actual KB Value of the other PCBTF and fluorinated solvent compositions set forth herein can likely also be obtained by determining the proportional composition average KB value.

Because the chemistry of a solvent constantly changes as materials are dissolved, it is highly advantageous to have a solvent that remains nonflammable and miscible across a wide range. The above examples reveal that the combination of a combustible liquid, PCBTF, with HFE and HFC liquids, resulted in a nonflammable miscible solvent over a wide range of mixture compositions. Indeed, no change in flammability characteristics occurred from 10 percent PCBTF to 90 percent PCBTF in connection with the above fluorinated solvents despite PCBTF alone being a combustible liquid.

Referring back to the above tables, because PCBTF is VOC exempt and the above fluorinated solvents not including trans-1,2-DCE (1,1,1,2,2,3,4,5,5,5-decafluoropentane and HFE 7100) are also free of VOCs, such combinations are highly environmentally friendly and would be classified as a totally non-VOC liquid. While fluorinated solvents incorporating trans-1,2-DCE would not be VOC exempt because, as stated above, trans-1,2-DCE contains VOCs, compositions containing lesser amounts of trans-1,2-DCE may be preferred to limit the amounts of VOCs.

While the combinations of PCBTF and fluorinated solvents not incorporating 1,2-DCE performed well and were compatible with typical organic binders, suspenders, and viscosity modifiers, they did not perform as well and were not as compatible as the combinations containing 1,2-DCE. Thus, potential 1,2-DCE substitutions that were VOC exempt were also tested to determine if high solvency power could be achieved while also maintaining nonflammability and safety for individuals and the environment.

A composition including approximately 42% 1,1,1,2,2,3,4,5,5,5-decafluoropentane, 38% PCBTF, and 20% acetone was tested. The addition of the acetone improved paintability and drying behavior and was classified as totally non-VOC. Further, the acetone improved the solvent's ability to mix and take in the organic binders and suspenders. Despite such improved characteristics however, the addition of 20 percent acetone caused the composition to become classified as flammable with a flash point of less than or equal to about 39.2 degrees Fahrenheit (4 degrees Celcius). Certain acetone additives were incorporated into the composition at a level of 12.5 percent of the acetone content in an attempt to reduce the flammability of the composition. As shown in Table IV below, flammability instead increased with the inclusion of such acetone additives.

TABLE IV

| Acetone Additive (12.5% Acetone Content) | Flash Point |
|---|---|
| No additive | ≤39.2° F. (4° C.) |
| Octyl Alcohol (CAS 111-87-5) | ≤35.6° F. (2° C.) |
| Tea Tree Oil (CAS 68647-73-4) | ≤35.6° F. (2° C.) |
| Polyalkylene Glycol Derivative (CAS 9038-95-3) | ≤28.4° F. (−2° C.) |
| Alpha Terpineol (CAS 98-55-5) | ≤28.4° F. (−2° C.) |

The solvent systems described herein were further tested to determine whether a nonflammable aerosol could be prepared. To prepare an aerosol system, a propellant additive was combined with the solvent system. As discussed above, 1,1,1,2-tetrafluoroethane, also known as HFC-134a and having a molecular formula $CF_3CH_2F$, may be used as a propellant. Alternatively, 1,3,3,3-tetrafluoropropen, also known as HFO-1234ze and having a molecular formula of $C_3H_2F_4$, may be used as the propellant. Both the HFC-134a propellant and the HFO-1234ze propellant allow for uniform spray until the aerosol is emptied. Furthermore, both HFC-134a and HFO-1234ze are nonflammable propellants but have sprays similar to sprays of flammable propellants. A filler material may also be included in the aerosol mixture. In one embodiment, boron nitride powder solids were used as the filler material.

To test the aerosol system for flammability, the aerosol system is added to an aerosol can. The spray may then be directed into a flame, such as a propane torch, and compared to a similar aerosol can containing standard flammable propane/butane propellants. Table V below discloses an example composition of the aerosol system, which was tested for flammability.

TABLE V

| Appx. Weight % | Component |
|---|---|
| 32% | HFC-134a propellant |
| 7% | Boron nitride solids |
| 22% | 1,1,1,2,2,3,4,5,5,5-decafluoropentane |
| 13% | Trans-1,2-DCE |
| 26% | PCBTF |

The amounts set forth in Table V are based upon a solvent composition having 43 weight percent PCBTF and 57 weight percent fluorinated solvent. The fluorinated solvent included approximately 62 through 63 weight percent 1,1,1,2,2,3,4,5,5,5-decafluoropentane and 37 through 38 weight percent trans-1,2-DCE blend (the Vertrel-MCA™ composition).

The aerosol system shown in Table V was compared with a typical flammable propane/butane propellant. There was no visible flame extension from the aerosol system shown in Table V when directed into the flame of a propane torch while the propane/butane mixture revealed a significant torch-like flame. The above aerosol system was also compared to two commercial aerosol cans purchased from 3M. The first was a contact cleaner having a composition similar to HFE 7100 with the addition of carbon dioxide. More particularly, the contact cleaner included approximately 50 through 70 percent methyl nonafluoroisobutyl ether, approximately 30 through 50 percent methyl nonafluorobutyl ether, and approximately 1 through 5 percent carbon dioxide. The second was an electronic degreaser having a composition similar to the composition of the brand name product Novec 72DE™ disclosed above and also having a small amount of carbon dioxide. Specifically, the electronic degreaser included approximately 65 through 72 weight percent trans-1,2-DCE, approximately 4 through 14 weight percent ethyl nonafluorobutyl ether, approximately 6 through 16 weight percent ethyl nonafluoroisobutyl ether, approximately 2 through 7 weight percent methyl nonafluorobutyl ether, approximately 3 through 8 weight percent methyl nonafluoroisobutyl ether, and approximately 1 through 5 weight percent carbon dioxide. Like the aerosol system set forth in Table V, the contact cleaner and electronic degreaser had no visible flame extension when sprayed into the flame of a propane torch. The aerosol mixture set forth in Table V was also directed into a candle flame, and observation showed no visible flame occurred.

Flame extension and flashback testing was also performed on the composition shown in Table V by Impact Analytical, Midland, Mich. using Canadian standards. Particularly, the "Test for Determining the Flashback and the Length of the Flame Projection of a Flammable Product Enclosed in a Spray Container," set forth in Consumer Chemicals and Containers Regulations, 2001, SOR/2001-269, Schedule 1. The results of the testing revealed that none of the samples produced a flame projection.

Evaporation and drying rates of solvent systems are frequently related to the boiling points for the systems. For example, typically the higher the boiling point of a solvent system, the longer the evaporation and drying rates. The boiling point of PCBTF is 282.2 degrees Fahrenheit (139 degrees Celsius) and therefore has a very slow drying rate. Mixing it however with fluorinated solvents, typically having boiling points between 102.2 degrees Fahrenheit (39 degrees Celsius) and 141.8 degrees Fahrenheit (61 degrees Celsius), significantly reduces the evaporation rate or drying time.

FIGS. 1 through 4 disclose schematic diagrams of boiling points of various solvent systems of the present invention. The boiling points were measured by Galbraith Labs using ASTMD110-11 standards and as set forth herein. The components of the solvent systems were combined at the designated weight percent concentration so that the mixtures were miscible in all proportions. The mixtures were distilled at ambient pressure (720 to 740 torr) in a concentric tube distillation column and then allowed to equilibrate at total reflux for at least 60 minutes. The boiling point of each distillate was measured using a thermocouple.

As discussed above, FIGS. 1 through 4 disclose the different boiling points with varying concentrations of PCBTF, denoted as Component B, and a fluorinated solvent, denoted as Component A. At zero percent on the diagram, the composition is entirely Component A, and the boiling point equals that of the fluorinated solvent. At 100 percent on the diagram, the composition is entirely Component B and would therefore equal the boiling point of PCBTF. The boiling points of 100 percent fluorinated solvent and 100 percent PCBTF were not tested and instead were taken from readily available Material Safety Data Sheets (MSDS) and related literature on the particular components.

FIG. 1 is a schematic diagram of boiling point versus percent concentration of PCBTF in a solvent system also having a fluorinated solvent wherein the fluorinated solvent is approximately 62 weight percent 1,1,1,2,2,3,4,5,5,5-decafluoropentane and approximately 38 weight percent trans-1,2-DCE. The brand name of the fluorinated solvent tested was Vertrel-MCA™, which has a listed boiling point of 102.2 degrees Fahrenheit (39 degrees Celsius). PCBTF has a listed boiling point of 282.2 degrees Fahrenheit (139 degrees Celsius). As shown in FIG. 1 and Table VI below (Table VI shows the exact compositions and measurements used to generate FIG. 1), the addition of PCBTF to the Vertrel-MCA™ fluorinated solvent increased the boiling point of the solvent system to between 238.6 degrees Fahrenheit (114.8 degrees Celsius) and 274.6 degrees Fahrenheit (134.8 degrees Celsius).

TABLE VI

| % Component A (Vertrel-MCA ™) | % Component B (PCBTF) | Boiling Point |
| --- | --- | --- |
| 100% | 0% | 102.2° F. (39° C.) |
| 90% | 10% | 242.4° F. (116.9° C.) |
| 75% | 25% | 238.6° F. (114.8° C.) |
| 57% | 43% | 267.4° F. (130.8° C.) |
| 50% | 50% | 274.6° F. (134.8° C.) |
| 25% | 75% | 271.0° F. (132.8° C.) |
| 10% | 90% | 260.4° F. (126.9° C.) |
| 0% | 100% | 282.2° F. (139° C.) |

Figure 2:
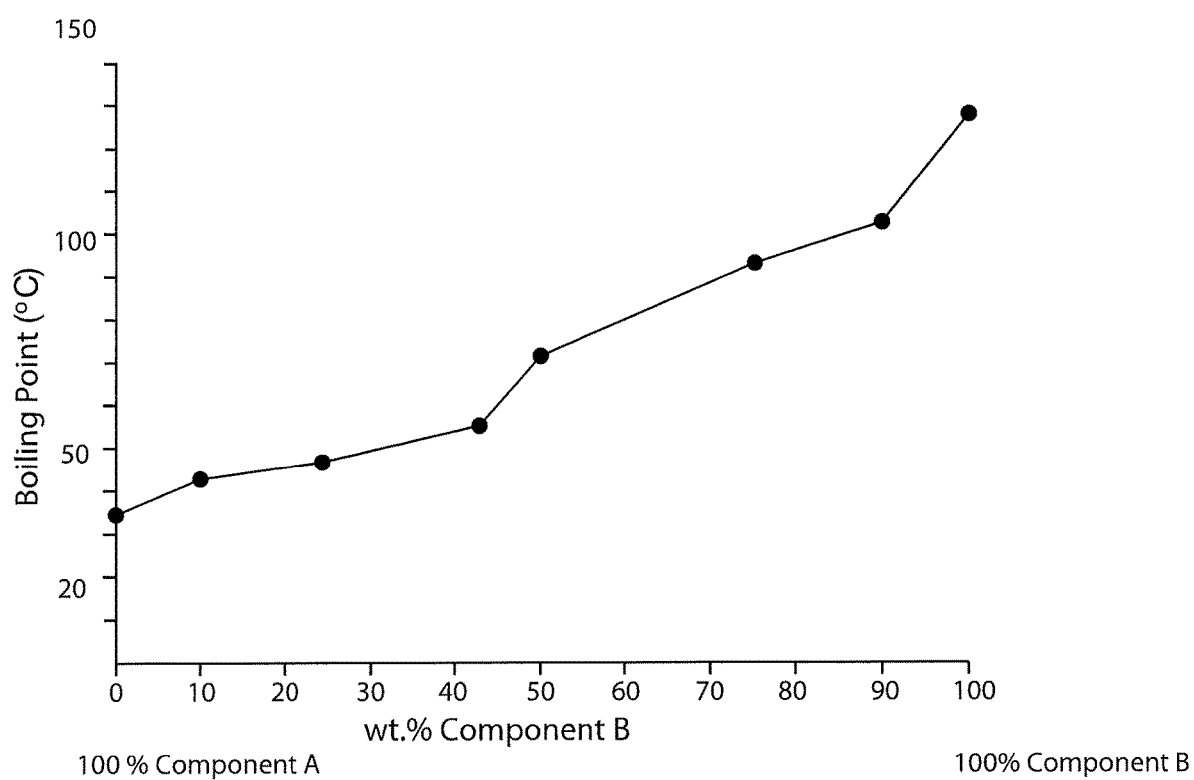
FIG. 2 is a schematic diagram of boiling point versus percent concentration of PCBTF in a solvent system also having a fluorinated solvent wherein the fluorinated solvent is a blend of hydrofluoroethers (HFEs) including ethyl nonafluorobutyl ether ($C_6H_5F_9O$), ethyl nonafluoroisobutyl ether ($C_6H_5F_9O$), methyl nonafluorobutyl ether ($C_5H_3F_9O$), methyl nonafluoroisobutyl ether ($C_5H_3F_9O$), and trans-1,2-DCE.

FIG. 2 is a schematic diagram of boiling point versus percent concentration of PCBTF in a solvent system also having a fluorinated solvent wherein the fluorinated solvent is a blend of hydrofluoroethers (HFEs) including ethyl nonafluorobutyl ether ($C_6H_5F_9O$), ethyl nonafluoroisobutyl ether ($C_6H_5F_9O$), methyl nonafluorobutyl ether ($C_5H_3F_9O$), and methyl nonafluoroisobutyl ether ($C_5H_3F_9O$). More particularly, the blend of HFEs is approximately 68 through 72 weight percent trans-1,2-DCE, approximately 4 through 16 weight percent ethyl nonafluorobutyl ether, approximately 4 through 16 weight percent ethyl nonafluoroisobutyl ether, approximately 2 through 8 percent methyl nonafluorobutyl ether, and approximately 2 through 8 percent methyl nonafluoroisobutyl ether. The brand name of the fluorinated solvent blend used was Novec 72DE™, which has a listed boiling point of 109.4 degrees Fahrenheit (43 degrees Celsius). As shown in FIG. 2 and Table VII below (Table VII shows the exact compositions and measurements used to generate FIG. 2), the addition of PCBTF to the Novec 72DE™ fluorinated solvent increased the boiling point of the solvent system to between 125.4 degrees Fahrenheit (51.9 degrees Celsius) and 232.9 degrees Fahrenheit (111.6 degrees Celsius), which was notably less than the Vertrel-MCA™ solvent system.

TABLE VII

| % Component A (Novec 72DE ™) | % Component B (PCBTF) | Boiling Point |
| --- | --- | --- |
| 100% | 0% | 109.4° F. (43° C.) |
| 90% | 10% | 125.4° F. (51.9° C.) |
| 75% | 25% | 134.2° F. (56.8° C.) |
| 57% | 43% | 148.8° F. (64.9° C.) |

TABLE VII-continued

| % Component A (Novec 72DE ™) | % Component B (PCBTF) | Boiling Point |
|---|---|---|
| 50% | 50% | 177.1° F. (80.6° C.) |
| 25% | 75% | 214.9° F. (101.6° C.) |
| 10% | 90% | 232.9° F. (111.6° C.) |
| 0% | 100% | 282.2° F. (139° C.) |

Figure 3:
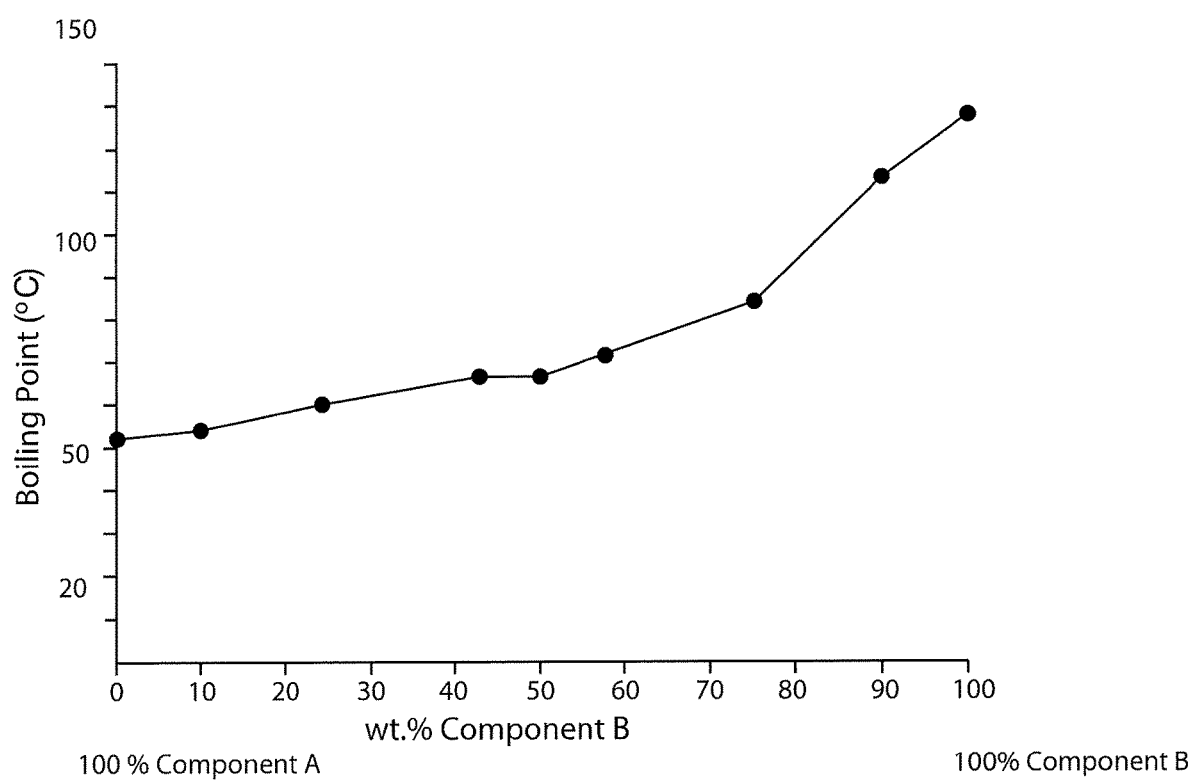
FIG. 3 is a schematic diagram of boiling point versus percent concentration of PCBTF in a solvent system also having a fluorinated solvent wherein the fluorinated solvent is methoxy-nonafluorobutane.

FIG. 3 is a schematic diagram of boiling point versus percent concentration of PCBTF in a solvent system also having a fluorinated solvent wherein the fluorinated solvent is methoxy-nonafluorobutane, also known as HFE 7100. The brand name of the fluorinated solvent tested was Novec HFE 7100™, which has a listed boiling point of 141.8 degrees Fahrenheit (61 degrees Celsius). As shown in FIG. 3 and Table VIII below (Table VIII shows the exact compositions and measurements used to generate FIG. 3), the addition of PCBTF to the Novec HFE 7100™ fluorinated solvent only increased the boiling point of the solvent system to between 146.5 degrees Fahrenheit (63.6 degrees Celsius) and 253.2 degrees Fahrenheit (122.9 degrees Celsius).

TABLE VIII

| % Component A (Novec HFE 7100 ™) | % Component B (PCBTF) | Boiling Point |
|---|---|---|
| 100% | 0% | 141.8° F. (61° C.) |
| 90% | 10% | 146.5° F. (63.6° C.) |
| 75% | 25% | 157.8° F. (69.9° C.) |
| 57% | 43% | 169.9° F. (76.6° C.) |
| 50% | 50% | 171.7° F. (77.6° C.) |
| 42% | 58% | 177.1° F. (80.6° C.) |
| 25% | 75% | 200.5° F. (93.6° C.) |
| 10% | 90% | 253.2° F. (122.9° C.) |
| 0% | 100% | 282.2° F. (139° C.) |

Figure 4:
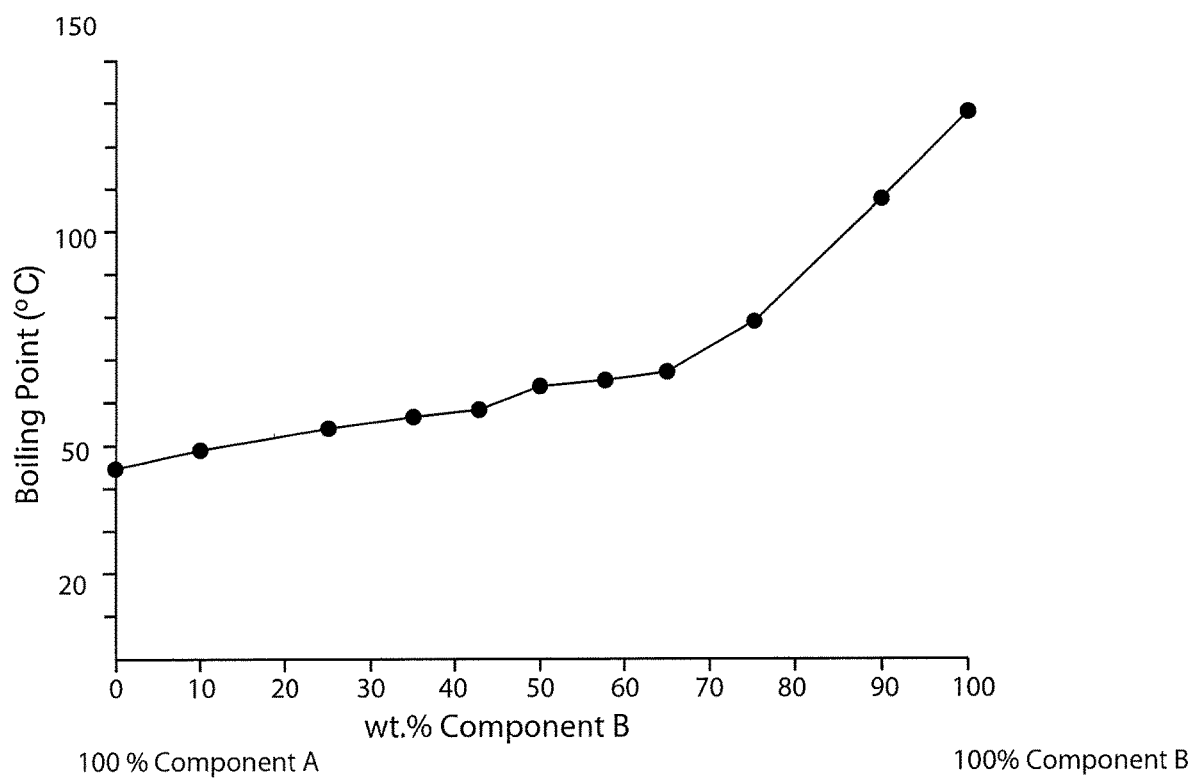
FIG. 4 is a schematic diagram of boiling point versus percent concentration of PCBTF in a solvent system also having a fluorinated solvent wherein the fluorinated solvent is 1,1,1,2,2,3,4,5,5,5-decafluoropentane.

FIG. 4 is a schematic diagram of boiling point versus percent concentration of PCBTF in a solvent system also having a fluorinated solvent wherein the fluorinated solvent is 1,1,1,2,2,3,4,5,5,5-decafluoropentane. The brand name of the fluorinated solvent tested was Vertrel-XF™, which has a listed boiling point of 131.0 degrees Fahrenheit (55 degrees Celsius). As shown in FIG. 4 and Table IX below (Table IX shows the exact compositions and measurements used to generate FIG. 4), the addition of PCBTF to the Vertrel-XF™ fluorinated solvent increased the boiling point of the solvent system to between 137.5 degrees Fahrenheit (58.6 degrees Celsius) and 244.9 degrees Fahrenheit (118.3 degrees Celsius).

TABLE IX

| % Component A (Vertrel-XF ™) | % Component B (PCBTF) | Boiling Point |
|---|---|---|
| 100% | 0% | 131.0° F. (55° C.) |
| 90% | 10% | 137.5° F. (58.6° C.) |
| 75% | 25% | 146.5° F. (63.6° C.) |
| 67% | 33% | 152.4° F. (66.9° C.) |
| 57% | 43% | 154.2° F. (67.9° C.) |
| 50% | 50% | 164.5° F. (73.6° C.) |
| 42% | 58% | 166.3° F. (74.6° C.) |
| 35% | 65% | 169.9° F. (76.6° C.) |
| 25% | 75% | 191.5° F. (88.6° C.) |
| 10% | 90% | 244.9° F. (118.3° C.) |
| 0% | 100% | 282.2° F. (139° C.) |

As shown in the above charts and FIGS. 1 through 4, the PCBTF solvent system having 1,1,1,2,2,3,4,5,5,5-decafluoropentane combined with trans-1,2-DCE on average had the highest boiling points while the systems incorporating the remaining three fluorinated solvents had similar boiling points. The higher boiling point of the PCBTF solvent system having 1,1,1,2,2,3,4,5,5,5-decafluoropentane combined with trans-1,2-DCE indicates that this system would have longer evaporation and drying rates, which is often less preferred depending on the intended use of the solvent.

The above compositions set forth in FIGS. 1 through 4 and Tables VI through IX were also tested to determine the flash points of the respective solvent systems. Pensky Martens Flashpoint testing complying with ASTM D63-11 was performed and no flash was observed for any of the solvent systems. Thus, the above solvent systems are usable in a number of applications including for use as a cleaning agent, as part of a cleaning composition, or as a paint carrier such as in nonflammable aerosol can formulations.

The evaporation rate of the solvent system having 43 percent PCBTF and 57 percent fluorinated solvent having 1,1,1,2,2,3,4,5,5,5-decafluoropentane combined with trans-1,2-DCE was further examined for workability in an aerosol can. The system was added to an aerosol can. Despite having a boiling point of approximately 267 degrees Fahrenheit (131 degrees Celsius), the solvent system maintained a reasonable drying time of approximately five minutes to dry completely after spraying onto a surface. This result however indicated that an even better evaporation rate, such as a rate similar to flammable solvent based systems incorporating ethyl alcohol and acetone (1-2 minutes), may be achievable by incorporating the lower boiling point fluorinated solvent systems.

Two solvent systems incorporating PCBTF and a blend of HFEs and trans-1,2-DCE were also tested using aerosol cans to determine evaporation rates. HFO-1234ze was incorporated as the propellant and boron nitride solids were incorporated as the filler material. The exact composition by weight percent for each solvent system example are shown below in Tables X and XI.

TABLE X

| Appx. Weight % | Example B - Components |
|---|---|
| 32% | HFO-1234ze propellant |
| 7% | Boron nitride solids |
| 55% | HFE blend with trans-1,2-DCE [10% Methyl NonaFluoroButyl/NonaFluoroIsoButyl Ether 20% Ethyl NonaFluoroButyl/NonaFluoroIsoButyl Ether 70% Trans-1,2-DCE] |
| 7% | PCBTF |
| | Liquid Mix Breakdown (no propellant or solids) |
| 89.2% | HFE blend with trans-1,2-DCE [10% Methyl NonaFluoroButyl/NonaFluoroIsoButyl Ether 20% Ethyl NonaFluoroButyl/NonaFluoroIsoButyl Ether 70% Trans-1,2-DCE] |
| 10.8% | PCBTF |

TABLE XI

| Appx. Weight % | Example B - Components |
|---|---|
| 45% | HFO-1234ze propellant |
| 9% | Boron nitride solids |

TABLE XI-continued

| Appx. Weight % | |
|---|---|
| 31% | HFE blend with trans-1,2-DCE |
| | [10% Methyl NonaFluoroButyl/NonaFluoroIsoButyl Ether |
| | 20% Ethyl NonaFluoroButyl/NonaFluoroIsoButyl Ether |
| | 70% Trans-1,2-DCE] |
| 15% | PCBTF |
| | Liquid Mix Breakdown (no propellant or solids) |
| 67.7% | HFE blend with trans-1,2-DCE |
| | [10% Methyl NonaFluoroButyl/NonaFluoroIsoButyl Ether |
| | 20% Ethyl NonaFluoroButyl/NonaFluoroIsoButyl Ether |
| | 70% Trans-1,2-DCE] |
| 32.3% | PCBTF |

Example A shown above in table X was very fast drying. The PCBTF/fluorinated solvent composition (Liquid Mix) of Example A exhibited a boiling point of approximately 125.6 degrees Fahrenheit (52 degrees Celsius). Example B shown above in table XI was slower drying than Example B and allowed time for the coating to wet and bond well with the surface. The drying time of Example B was approximately 2 through 3 minutes, which is approximately the same drying rate as the flammable solvents incorporating ethyl-alcohol or acetone discussed above. The PCBTF/fluorinated solvent composition (Liquid Mix) of Example B exhibited a boiling point of approximately 140 degrees Fahrenheit (60 degrees Celsius). Thus a PCBTF/fluorinated solvent composition having a boiling point of approximately 123.8 degrees Fahrenheit (51 degrees Celsius) to approximately 141.8 degrees Fahrenheit (61 degrees Celsius) produces preferred evaporation when using the weight percents of propellant and solid levels disclosed in Tables X and XI above and spraying out of an aerosol can. More preferred is a PCBTF/fluorinated solvent composition having a boiling point of approximately 125.6 degrees Fahrenheit (52 degrees Celsius) to approximately 140 degrees Fahrenheit (60 degrees Celsius). And even more preferred is a PCBTF/fluorinated solvent composition having a boiling point of approximately 140 degrees Fahrenheit (60 degrees Celsius).

Flame extension and flashback testing was also performed on the composition of Example B shown above in table XI by Impact Analytical, Midland, Mich. per US regulations outlined in CFR Part 16, Section 1500.45, flame extension and flash back testing per Canadian Consumer Chemicals and Containers Regulations, 2001 (SOR/2001-269), Schedule 1, "Test for Determining the Flashback and the Length of the Flame Projection of a Flammable Product Enclosed in a Spray Container," and ignition distance testing per Regulation (EC) No. 1272/2008 in accordance with the UN recommendations on the transport of dangerous goods, manual of tests and criteria, Part III, sub section 31.4 "Ignition Distance Test for Spray Aerosols." The results of the testing using US, Canadian, and EC test guidelines revealed that none of the samples produced a flame projection/extension or a flashback of ignition.

The propellant in Composition B shown in Table XI was eliminated to determine the workability of the composition as a bulk paint, such as a brushable or air-sprayable paint not in an aerosol can. To create a bulk paint, a paint base such as boron nitride powder, including solids, is preferably included in the composition. Preferably such solids are added in amounts up to approximately 25 weight percent of the total composition. Maintaining the same weight percentages minus the propellants shown in Table XI, a bulk paint was created having a composition including 16 weight percent boron nitride solids, 27 weight percent PCBTF, and 57 weight percent HFE blend with trans-1,2-DCE (breakdown shown in table above). The composition was very workable as a nonflammable brushable or air-sprayable paint.

The bulk paint of Table XI was also modified by addition of more PCBTF to have a composition including 16 weight percent boron nitride solids, 42 weight percent PCBTF, and 42 weight percent HFE blend with trans-1,2-DCE, which led to better adherence and paintability due to a somewhat slower drying time.

Additional Compositions C, D, and E having no trans-1,2-DCE were examined for workability as a bulk paint while maintaining no VOC due to the elimination of the trans-1,2-DCE. Compositions C, D, and E are shown in Tables XII, XIII, and XIV, respectively below.

TABLE XII

| Appx. Weight % | |
|---|---|
| | Example C - Components |
| 20% | Boron nitride solids |
| 48% | 1,1,1,2,2,3,4,5,5,5-decafluoropentane |
| 32% | PCBTF |
| | Liquid Mix Breakdown (no solids) |
| 60% | 1,1,1,2,2,3,4,5,5,5-decafluoropentane |
| 40% | PCBTF |

TABLE XIII

| Appx. Weight % | |
|---|---|
| | Example D - Components |
| 20% | Boron nitride solids |
| 64% | 1,1,1,2,2,3,4,5,5,5-decafluoropentane |
| 16% | PCBTF |
| | Liquid Mix Breakdown (no solids) |
| 80% | 1,1,1,2,2,3,4,5,5,5-decafluoropentane |
| 20% | PCBTF |

TABLE XIV

| Appx. Weight % | |
|---|---|
| | Example E - Components |
| 20% | Boron nitride solids |
| 48% | HFE 7100 |
| 32% | PCBTF |
| | Liquid Mix Breakdown (no solids) |
| 60% | HFE 7100 |
| 40% | PCBTF |

Composition C resulted in a workable bulk boron nitride paint. Because the boiling point of the Liquid Mix was approximately 154.4 degrees Fahrenheit (68 degrees Celsius), this composition would also likely have a reasonable evaporation rate and therefore work well in an aerosol can. Furthermore, incorporating the HFO-1234ze propellant with Composition C would yield a completely non-VOC and nonflammable solvent since both PCBTF and 1,1,1,2,2,3,4,5,5,5-decafluoropentane are VOC exempt and the Liquid Mix resulted in no flash being observed.

Composition D also resulted in a workable bulk boron nitride paint and incorporating less PCBTF results in a faster drying rate than Composition C. Like Composition C, Composition D yields a completely non-VOC and nonflammable solvent since both PCBTF and 1,1,1,2,2,3,4,5,5,5-decafluoropentane are VOC exempt and the Liquid Mix resulted in no flash being observed.

Instead of using 1,1,1,2,2,3,4,5,5,5-decafluoropentane as the fluorinated solvent in Composition E, HFE 7100 was incorporated into Composition E using the same weight percents as Composition C. Composition E resulted in a workable bulk boron nitride paint. Because the boiling point of the Liquid Mix of PCBTF and HFE 7100 is slightly higher than the Liquid Mix of PCBTF and 1,1,1,2,2,3,4,5,5,5-decafluoropentane, Composition E dries slightly slower than Composition C. Like Composition C, however, Composition E yields a completely non-VOC and nonflammable solvent since both PCBTF and HFE 7100 are VOC exempt and the Liquid Mix resulted in no flash being observed.

A further Composition F shown in Table XI IV below was tested utilizing a blend of HFCs as the fluorinated solvent. Particularly, a combination of 1,1,1,3,3-pentafluorobutane and 1,1,1,2,3,3,3-heptafluoropropane sold under the brand name Solkane 365/227™ was used. Composition F resulted in a workable boron nitride paint and test revealed that it was a nonflammable composition.

TABLE XIIV

Appx. Weight %

| | Example F - Components |
|---|---|
| 16% | Boron nitride solids |
| 42% | HFC blend |
| | [93% 1,1,1,3,3-pentafluorobutane |
| | 7% 1,1,1,2,3,3,3-heptafluoropropane] |
| 42% | PCBTF |
| | Liquid Mix Breakdown (no solids) |
| 50% | HFC blend of 1,1,1,3,3-pentafluorobutane and |
| | 1,1,1,2,3,3,3-heptafluoropropane (Solkane 365/227 ™) |
| 50% | PCBTF |

An additional solvent system and bulk paint was tested using a slightly different Solkane 365/227™ blend but the same Liquid Mix/Solids proportions as shown in Table XIIV. Particularly, an HFC blend of approximately 13 weight percent 1,1,1,2,3,3,3-heptafluoropropane and 87 weight percent 1,1,1,3,3-pentafluorobutane was used. This composition also resulted in a workable boron nitride paint with a nonflammable composition and had faster drying times than the HFC composition shown in Table XIIV.

In addition to the components set forth in the above tables and examples, non-aqueous extender chemicals such as acetone, isopropyl alcohol, methanol, and ethanol may be incorporated in varying quantities into the fluorinated solvent systems of the present invention. Furthermore, HFCs and HFEs may contain azeotropes utilizing non-aqueous extenders. Wetting-improvers and compatible additives that give better flow properties, wetting, and surface coverage onto metal or other substrates may also be incorporated without departing from the spirit and scope of the present invention. It is preferred that the addition of non-aqueous extender chemicals, wetting improvers, and other compatible additives are added in quantities that allow a solvent system to maintain non-flammability when such system is non-flammable prior to such additions. For example, no flash was observed using Pensky-Martens Flashpoint when benzyl alcohol was incorporated at an approximately 1 percent level to a solvent system having 43 percent PCBTF and 57 percent fluorinated solvent, wherein the fluorinated solvent included 62 weight percent 1,1,1,2,2,3,4,5,5,5-decafluoropentane and approximately 38 weight percent trans-1,2-DCE. Likewise, no flash was observed using Pensky-Martens Flashpoint when incorporating approximately 1 percent levels of butyl carbitol, approximately 1 percent levels of isoamylpropionate, approximately 1 percent levels of isoamylbutyrate, and approximately 1 percent levels of d-limonene independently into the same solvent system. Despite incorporating only approximately 1 percent of these additives into the solvent system, the flow and wetting properties of the solvent system onto the surface was significantly improved. Moreover, 1 percent levels of benzyl alcohol, butyl carbitol, and amyl butyrate were independently added to Composition F above to determine if such additions would improve paintability. Benzyl alcohol improved the brushing ability of the paint on a surface, while butyl carbitol and amyl butyrate did little to aid in paintability/brushability without the addition of other additives.

While various embodiments and examples of this invention have been described above, these descriptions are given for purposes of illustration and explanation, and not limitation. Variations, changes, modifications, and departures from the systems and methods disclosed above may be adopted without departure from the spirit and scope of this invention. In fact, after reading the above description, it will be apparent to one skilled in the relevant art(s) how to implement the invention in alternative embodiments. Thus, the present invention should not be limited by any of the above described exemplary embodiments.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A bulk paint system comprising:
   a miscible solvent including
      between about 10 to about 90 weight percent PCBTF and
      between about 10 to about 90 weight percent fluorinated solvent; boron nitride powder; and
      between about 32 to 45 weight percent of a propellant, said paint system being insertable into an aerosol spray container.

2. A bulk painting system comprising:
   46 to 61 weight percent of a miscible solvent including
      between about 10 to about 90 weight percent PCBTF
      between about 10 to about 90 weight percent fluorinated solvent; and
   7 to 9 weight percent boron nitride powder; and
   32 to 45 weight percent propellant.

* * * * *